United States Patent [19]

Biglino

[11] Patent Number: 4,467,231
[45] Date of Patent: Aug. 21, 1984

[54] PERMANENT-MAGNET D.C. ELECTRIC MOTOR WITH RESILIENT STATOR YOKE

[75] Inventor: Renato Biglino, Genoa, Italy
[73] Assignee: Polymotor Italiana S.p.A., Italy
[21] Appl. No.: 435,434
[22] Filed: Oct. 20, 1982
[51] Int. Cl.³ .................................................. H02K 21/26
[52] U.S. Cl. ............................ 310/154; 310/40 MM; 310/218; 310/254; 310/259
[58] Field of Search .............. 310/40 MM, 42, 89, 91, 310/154, 2, 216, 218, 254, 258, 217, 256, 259

[56] References Cited

U.S. PATENT DOCUMENTS

| 2,325,915 | 8/1943 | Naul | 310/154 |
| 3,444,402 | 5/1969 | Cartier | 310/40 R |

FOREIGN PATENT DOCUMENTS

| 1102898 | 3/1961 | Fed. Rep. of Germany | 310/154 |
| 1136549 | 5/1957 | France | 310/154 |
| 1477233 | 3/1967 | France | 310/154 |

Primary Examiner—J. D. Miller
Assistant Examiner—D. L. Rebsch
Attorney, Agent, or Firm—Seidel, Gonda & Goldhammer

[57] ABSTRACT

A d.c. electric motor wherein the permanent magnets are kept in place by elastic fastening means carrying out an active magnetic function. The fastening means preferably includes yoke sectors each formed by two or more superimposed sheet members having angular extensions progressively decreasing. The motor further includes an anti-inductive frame formed by at least two equally spaced apart longitudinal portions and by one or more transverse portions forming an open or closed path respectively of material that is electrically conductive but not ferromagnetic. The frame further provides a housing for a temperature sensor in a recess and an insulating tubular envelope.

15 Claims, 5 Drawing Figures

PERMANENT-MAGNET D.C. ELECTRIC MOTOR WITH RESILIENT STATOR YOKE

The present invention relates to an improved d.c. electric motor wherein the stator magnetic field is produced by two or more permanent magnets. The invention can be applied also in multipolar electric motors even if it will be disclosed for simplicity with particular reference to a two-pole electric machine.

BACKGROUND OF THE INVENTION

Low power electric motors of this type are usually employed in household appliances, servo controls, etc., thanks to their simple construction, low cost and to the good speed regulation characteristics allowed. More particularly the electric motors of the prior art comprise a rotor suitably supported by bearings and rotating in the field generated by two or more permanent magnets fastened to the stator or armature and producing the so called stator field. The known constructions provide for a stator structure formed by a metal tubular body into which there are glued or otherwise fastened the permanent magnets and into which a rotor, suitably supported with respect to the tubular structure, is mounted. This known and widespread construction has a number of shortcomings, mainly due to the tubular shape of the outer structure. This latter requires difficult machining with a cost not negligible when compared with the final cost of the motor. Moreover, due to the brittleness of the material of the permanent magnets, the electric motors are not easy to be assembled and have inconveniences during their use. First of all glueing the material means an additional step and is not the best way to fasten the tubular structure or frame and the magnets together. On the second hand the dimensional tolerances for the magnets must be rather close in order that the air gap between the magnets and the rotor has the desired dimensions, and this is not easy to obtain because of the nature of the materials (ferrites) from which magnets are normally formed and of the thermal treatment they undergo.

As for the working, should the magnets break or splinter because of an impact, usually the motor is permanently damaged by the splinters falling into the air gap.

A further inconvenience comes from the magnetic continuity (i.e. the closed magnetic path) of the tubular member which favours the demagnetization of the permanent magnets under overload conditions, thereby reducing the motor performance.

The improved electric motor of the invention substantially eliminates the above incoveniences and achieves additional advantages, particularly as pertains to the temperature control.

SUMMARY OF THE INVENTION

In the permanent magnet d.c. electric motor of the invention the tubular element is replaced by yoke sectors fastening the permanent magnets into the desired position. Preferably the yoke sectors are of a ferromagnetic material and the end portion of each sector partially overlaps two adjacent permanent magnets exerting an elastic pressure over them.

According to other characteristics of the invention, the stator is equipped with an anti-inductive frame of a material that is electrically conductive but not ferromagnetic, formed by at least two longitudinal segments, parallel to the motor axis, that can be connected together at one or both ends to form an open or closed loop respectively, thus reducing the undesired inductive effects and thereby improving the commutation.

BRIEF DESCRIPTION OF THE DRAWINGS

These and other advantages of the invention will be evident from the following description of some preferred but not limiting embodiments illustrated in the attached drawings in which.

DETAILED DESCRIPTION OF THE INVENTION

Figure 1:
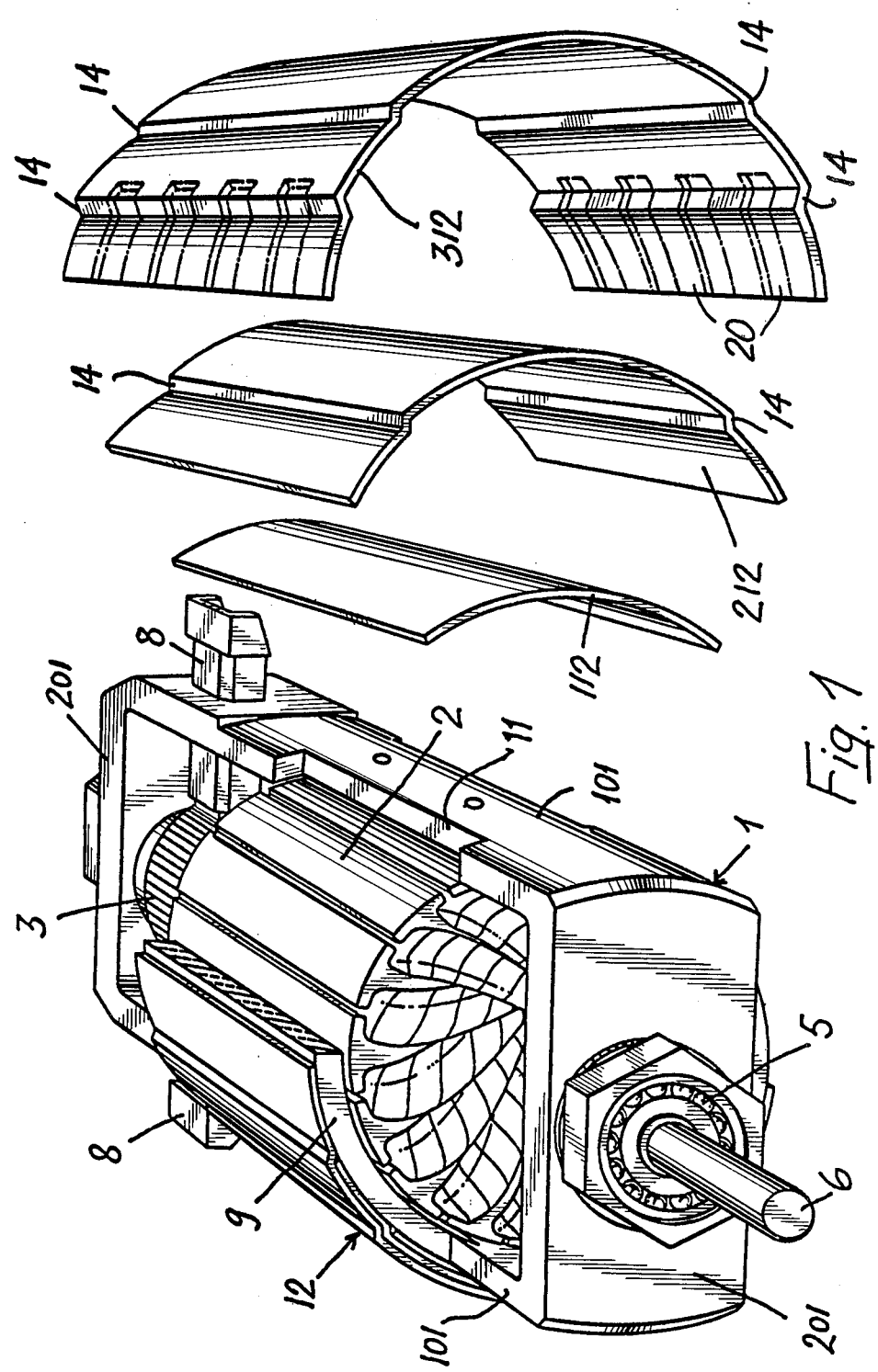
FIGS. 1 and 3 are a perspective and a cross-section views respectively of a two-pole electric motor according to the invention.
Figure 3:
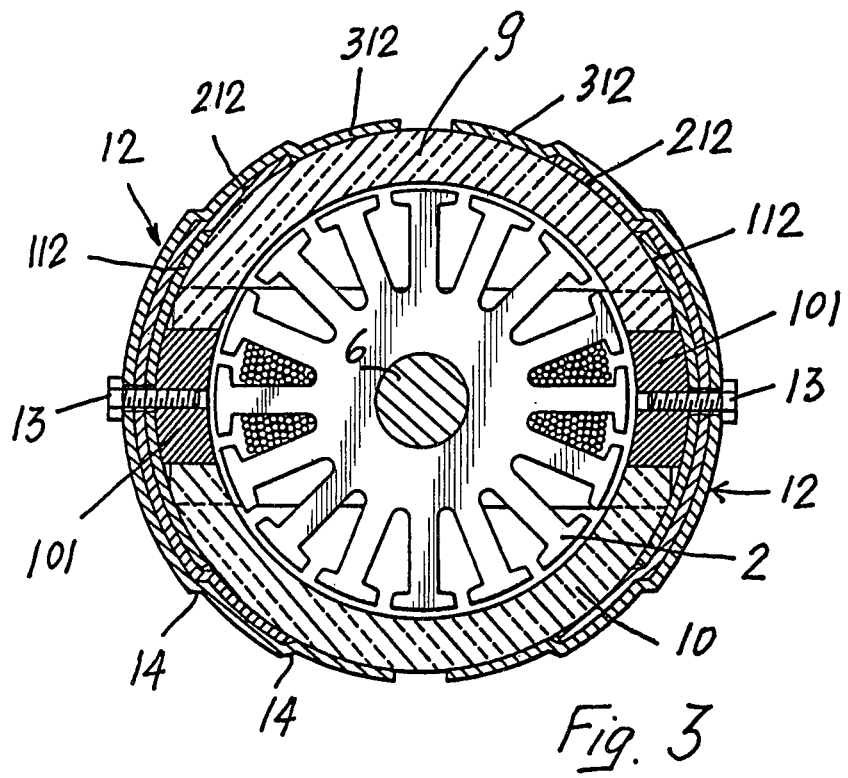

The electric motor shown in FIGS. 1 and 3 is a two-pole commutator motor wherein the poles are permanent magnets, and the characteristics of the present invention will be illustrated with reference to this particular motor. It is anyhow to be understood that the characteristics of the invention apply in like manner, and achieving the same advantages, to motors having a higher number of poles as will be evident to those skilled in the art.

With reference to FIGS. 1 and 3, the motor stator comprises an anti-inductive frame forming a closed path, i.e. a frame 1 of a rigid material that is electrically conductive but not ferromagnetic such as a light weight aluminum alloy. Frame 1 is built up by two longitudinal segments or sides 101, diametrically opposed with respect to rotor 2 of the motor armature and parallel to the motor axis, connected together by means of cross members 201 outside the motor head, commutator 3 and armature 2.

Frame 1 is preferably built as one piece, integrating and supporting the stator. Frame cross members 201 are provided with bores 4 for bearings 5 of shaft 6 whereas longitudinal segments 101 carry seats 7 in correspondence of commutator 3 for brush holders 8. Frame longitudinal segments 101 support two permanent magnets 9, 10 generating the stator field.

In the illustrated embodiment each permanent magnet 9, 10 is shaped as an angular cylindrical sector having the ends that engage corresponding recesses 11 on longitudinal segments 101 and abutting on them.

The inner surface of each magnet 9, 10 is cylindrical and coaxial with respect to armature 2, thereby defining a uniform air gap. The magnets are fastened to frame 1 by means of two yoke sectors 12 having a tubular or arched shape on the whole. Each yoke sector 12 is made of a ferromagnetic material and is fastened at its central portion to a longitudinal segment of frame 1, e.g. by a screw 13, and partially overlays both magnets 9, 10, exerting an elastic pressure against them.

Figure 2:
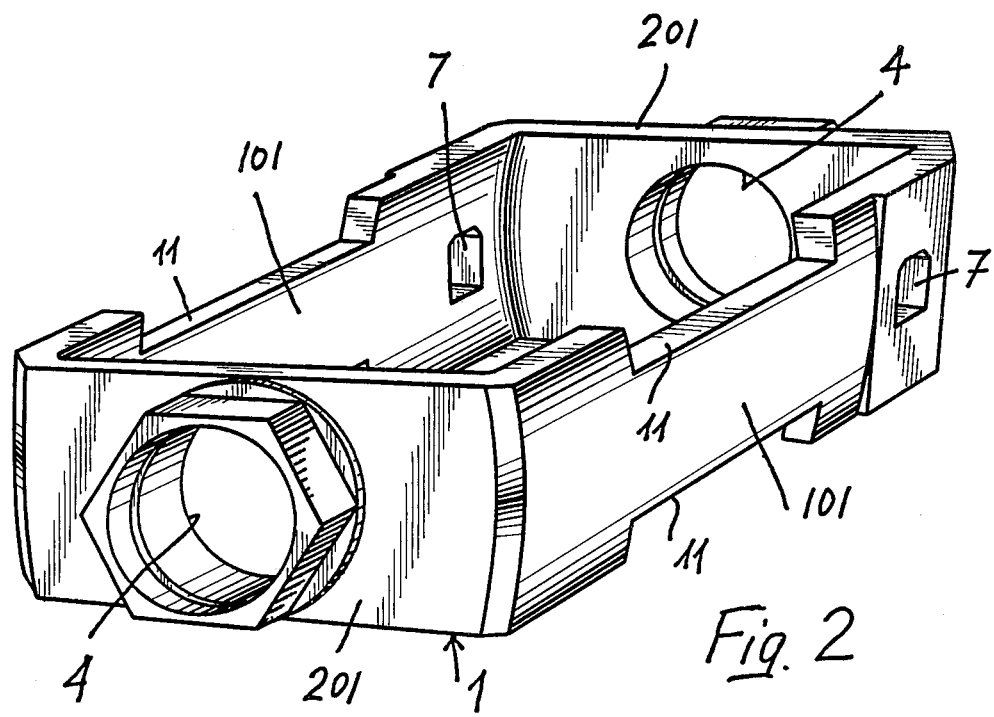
FIG. 2 is a perspective view of the structure that realizes the anti-inductive frame of the motor shown in FIG. 1.

The thickness of both yoke sectors progressively decreases from the central area toward the yoke ends and their angular extension is less than 180° in the illustrated embodiment. This way an interruption is created in the magnetic path or circuit that significantly enhances the motor resistance to demagnetization, thereby making possible performance and constructive solutions that would not be easily achieved in conventional motors. A preferred arrangement to decrease the thickness of yokes 12 is shown in FIGS. 1 to 3, wherein each yoke sector resembles a spring leaf structure and is formed by a plurality of packed arched metal sheets 112, 212, 312 having an angular extension progressively decreasing. To ensure the best contact of the superimposed metal leaves between each other, as well as with the corresponding portions of magnets 9, 10, the profile of the outer elements 312, 212 is stepwise, with step fold 14 in correspondence with the edges of the inner elements 212, 112 as clearly seen in FIGS. 1 to 3. In order to obtain a more uniform pressure on the magnets, the end portion of yoke sectors 12 can have a comb structure or be provided with slots and/or ribs 20 so as to present a plurality of elastic projections schematically shown with dashed lines for the outermost element 312 only.

According to an alternative embodiment, the arched leaf elements can be decreasing from the innermost one and in this case each element will be slightly pre-bent in a way opposed to the one shown in the figures.

Thanks to the elasticity of the thus-formed structure the yoke can be fitted to magnets having unregular shapes, thus performing a double function: a magnetic one and a mechanical one. According to the invention it is therefore possible to employ rough magnets and to avoid glueing.

Longitudinal segments 101 of the anti-inductive frame can be connected at one or both ends, outside the corresponding rotor heads, by means of transverse or cross members 201 in order to form an open path (a C path) or a closed (annular) path of material that is electrically conductive but not ferromagnetic. Thus the undesired effects of the inductance are substantially reduced and the commutation is improved so that larger magnets and a lower number of winding slots can be used. In a motor having a higher number of poles the anti-inductive frame includes a longitudinal segment between each pair of adjacent magnets and these segments may be connected together at one or both ends by means of transverse members even common to more than one longitudinal segment. Preferably the frame is built from a rigid material, e.g. an aluminum alloy, and/or is fastened to a rigid structure or incorporated into the same, forming an integer with the stator and supporting this latter. More particularly in multipolar motors the frame constitutes a cage, either alone or in combination with the rigid associated structure. In such embodiments, the longitudinal segments of the frame or cage can be equipped with means to position and to support the permanent magnets, whereas the frame cross members can carry the bearings of the rotor shaft as shown in the illustrated embodiment. This way the anti-inductive frame accomplishes also a mechanical function, allowing for a lighter stator and making easier the assembly that can be an automatized assembly.

Figure 5:
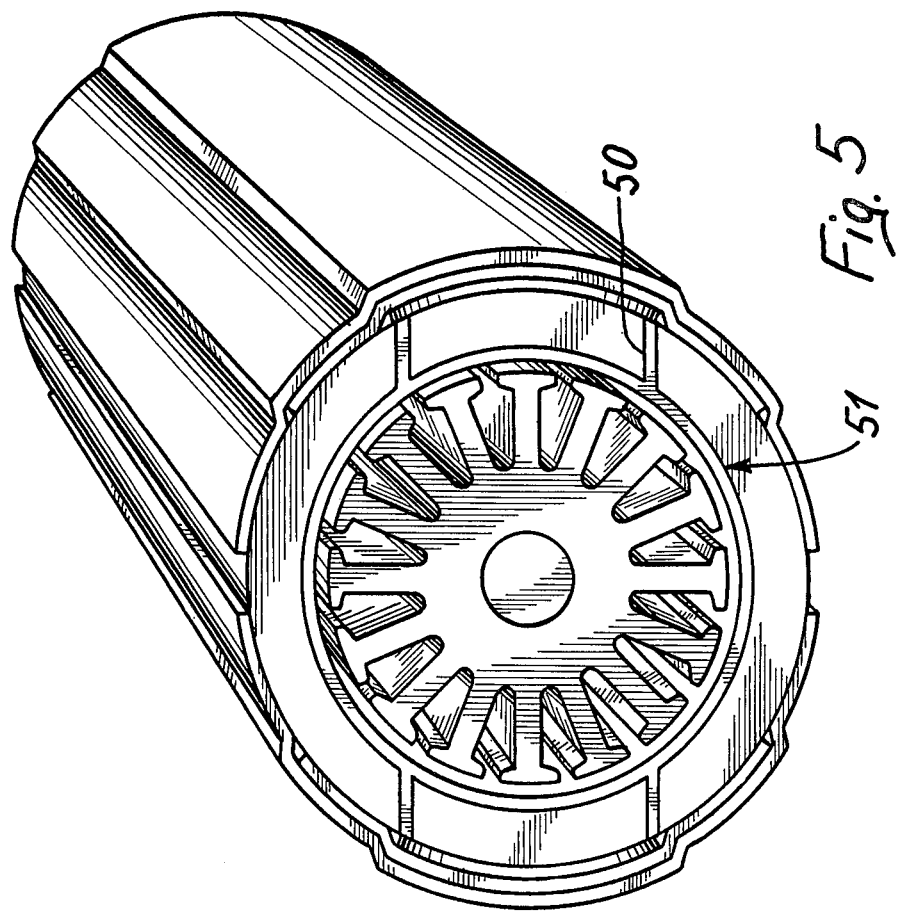
FIGS. 4 and 5 schematically illustrate two different embodiments of the invention.

According to another characteristic of the invention the frame, being placed in proximity of the rotor, can be built of a material having an high thermal conductivity to effectively improve the dissipation of the heat that is transmitted to the surrounding space through the frame. According to another characteristic of the invention the frame has a recess (50 in FIG. 5) housing a thermal or thermoammeter device that will be responsive to the true temperature for the above-stated reasons.

Thanks to the tubular shape of the air gap, it is possible to obtain a uniform ventilation to cool the motor that otherwise would be dispersed at the sections having a larger air gap. The extension of the yoke sectors, or of the magnets or of the anti-inductive frame makes possible to house a centrifugal fan with minimum air gap that is characterized by a high efficiency thanks to the tubed construction.

According to a still further characteristic (FIG. 5) a portion of the anti-inductive frame and all the air gap are enveloped by a further tubular structure of a non conductive material 51. This structure can be extended to form one of the motor shields supporting, for example, the brushes and one of the bearings. This tubular envelope realizes an additional effective insulation (double insulation) among the rotor, the brushes and the metal parts of the frame. Furthermore it is possible to use magnets formed by more than one piece and having surface defects since fragments are prevented from entering the air gap.

Figure 4:
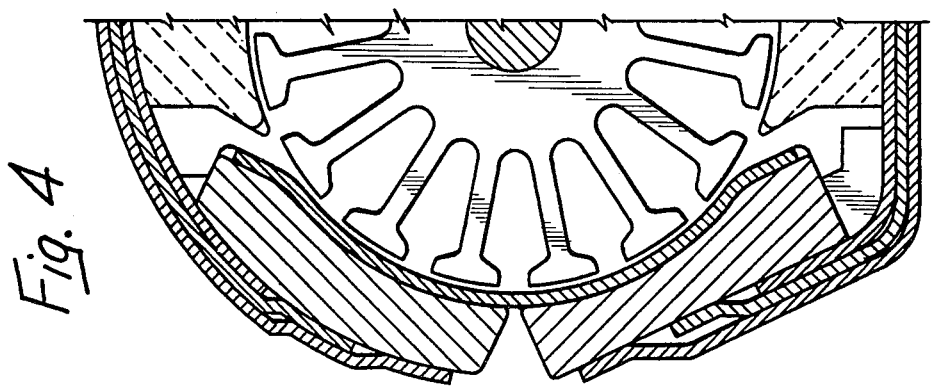

When the magnets are formed by more than one piece, the magnetic coercivity is preferably different for the pieces forming the magnets in order to improve the resistance to demagnetization. Furthermore one or more recurve segments of ferromagnetic material can placed between the tubular, non conductive portion of the frame and the magnets. These segments are kept in place by the pressure exerted onto the magnets by the elastic yokes and ensure the roundness of the air gap thus concentrating the magnetic flux. One such embodiment is shown in FIG. 4. The magnets can be larger than the rotor and the segment short circuit the armature reaction thereby further improving the characteristic of the motor against demagnetization of the motor.

Although the invention has been disclosed with reference to some preferred embodiments, they are not limiting the scope of the invention which extends to all the obvious changes and modifications that will be evident to the skilled in the art.

What I claim is:

1. A d.c. electric motor in which the fixed magnetic field is produced by permanent magnets, comprising a rotor having a coaxial armature and commutator, the commutator having windings and being in frictional contact with brushes carried by brush holders mounted on a stator, the stator having an elongated frame including at least two longitudinal rigid members equally spaced apart from and substantially parallel to the motor axis, and having a yoke external to and surrounding at least a portion of the frame, the yoke comprising first and second sections of resilient ferromagnetic material, said yoke sections resiliently holding said permanent magnets in position around said rotor and forming a magnetic path for the field of said magnets.

2. An electric motor as in claim 1, wherein each said yoke section is fastened at its middle portion to one of said longitudinal rigid members, each yoke section overlying a portion of each of two opposed permanent magnets.

3. An electric motor as in claim 2, wherein each yoke section has a cross-section progressively decreasing from the central part towards the ends and has a circumferential extension smaller than 180°.

4. An electric motor as in claim 3, wherein each yoke section comprises at least two metal sheet elements superimposed to each other and having a progressively decreasing angular extension from outer to inner sheets.

5. An electric motor as in claim 4, wherein the ends of the outer sheet are provided on their inner surfaces with a plurality of elongated projections orthogonal to the sheet edges.

6. An electric motor as in claim 4, wherein said frame is made of a material that is electrically conductive but not ferromagnetic.

7. An electric motor as in claim 6 wherein said longitudinal members have a length such as to embrace a portion of the linked magnetic field of the commutator windings.

8. An electric motor as in claim 6, wherein said longitudinal members are connected together at least at one end and externally to the rotor heads so as to form a path of a material that is electrically conductive but not ferromagnetic, said path being open when said longitudinal members are connected at only one end and closed when said longitudinal members are connected at both ends.

9. An electric motor as in claim 8, wherein said frame includes two longitudinal members for each pair of motor poles, thus forming a cage.

10. An electric motor as in claim 9, wherein said anti-inductive armature is built from a rigid material such as an aluminum alloy.

11. An electric motor as in claim 10, wherein said longitudinal members are equipped with means for positioning, supporting and fastening the permanent magnets, said frame also having transverse members supporting bearings for the motor shaft.

12. An electric motor as in claim 11, wherein the longitudinal members are provided with recesses for engaging the ends of the permanent magnets.

13. An electric motor as in claim 12, wherein said frame is provided with a housing for a temperature sensor for the protection circuit of the motor.

14. An electric motor as in claim 13, comprising a tubular non conductive structure insulating the rotor, brushes and armature metal parts from each other.

15. An electric motor as in claim 14, wherein the permanent magnets are formed by a plurality of magnetic blocks.

* * * * *